July 18, 1933.  R. H. MUELLER  1,918,417
MEANS FOR FORMING A PIPE JOINT
Filed Sept. 27, 1930
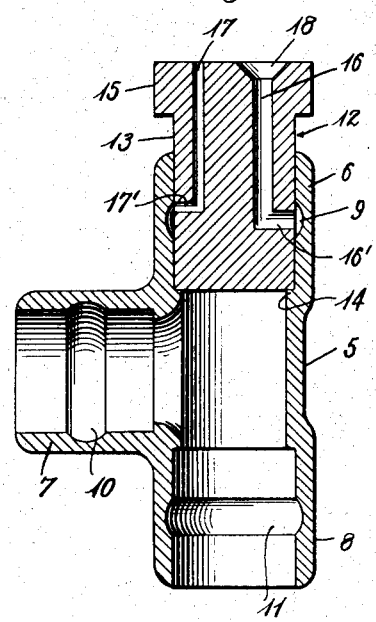
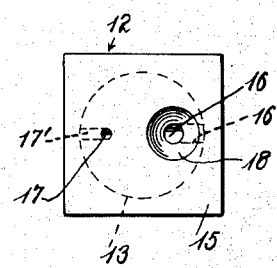
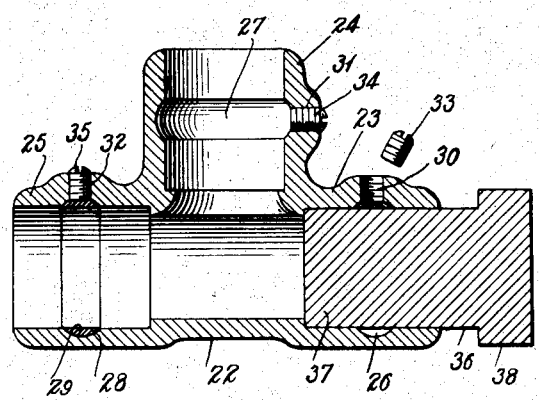
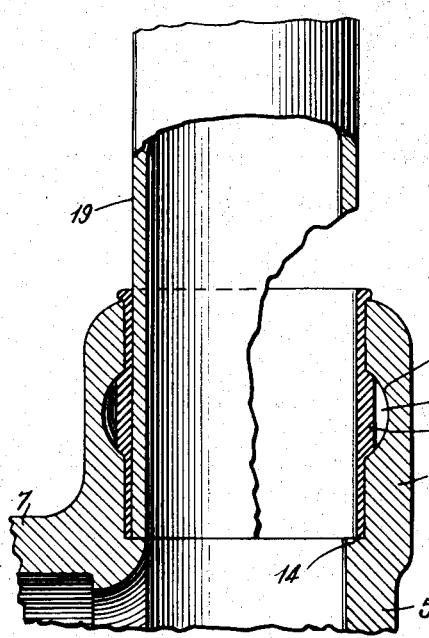
Inventor
Robert H. Mueller
By Cushman, Bryant & Darby
Attorneys Patented July 18, 1933

1,918,417

UNITED STATES PATENT OFFICE

ROBERT H. MUELLER, OF DECATUR, ILLINOIS, ASSIGNOR TO MUELLER CO., OF DECATUR, ILLINOIS, A CORPORATION OF ILLINOIS

MEANS FOR FORMING A PIPE JOINT

Application filed September 27, 1930. Serial No. 484,901.

The present invention relates to means and method for applying a body of fusible bonding material in a preformed recess in a coupling member so as to enable the member, upon subsequent fusing of the material, to form a strong and tight joint with a pipe end or the like. The invention is particularly applicable in copper and brass installations.

Broadly considered, it is well known to secure a pipe end in a coupling sleeve by means of a fusible ring of bonding material interposed between the two elements. Heretofore, however, the introduction of the fusible material into the preformed cavity has necessarily been accomplished on the job and often, due to an awkward or inaccessible location of the work, great difficulties are encountered. According to the present invention, the bonding material may be applied in the cavity at the factory if desired so that all that is necessary to complete the joint at the job is the application of heat to the exterior of the coupling to effect fusing of the bonding material. This preliminary setting of the bonding material in the coupling involves the use of a mandrel which is inserted in the coupling sleeve to close the interior cavity with the exception of a small sprue opening, the mandrel being removed subsequently to the introduction and hardening of the material. The mandrel is of such shape as to conform the exposed surface of the bonding body to the inner surface of the coupling member.

When a joint is to be made, the pipe end is merely inserted in the coupling member and a suitable flux having been applied to the parts, heat is applied to the coupling member to fuse the bonding body and cause it to distribute itself in a thin layer or film between the contiguous pipe and coupling member surface.

It has been found in practice that if an ordinary soldering acid is used, it is apt to become evaporated before the fitting is hot enough to fuse the solder insert upon the application of heat to the coupling. Moreover, the soldering acid being fluid, it is quite difficult to spread it over and retain it on the surfaces to be joined under any conditions since it tends to collect in small isolated bubbles.

I have found, however, that when soldering paste is used a perfect joint may be readily secured. The paste may be spread evenly over the entire surface of the pipe and has a tendency to fill the space between the pipe and fitting and apparently increases the capillary action upon fusing of the solder. Although the paste, of course, melts down upon the application of heat, it seems that the action of the paste and solder melting is such that as soon as the paste begins to melt and show at the end of the fitting, the solder will follow it up and also appear at the end of the fitting, thus indicating a completed joint.

Hence, as a flux, I prefer to use soldering paste since it can be placed easily over the entire surface of the joint, it does not dry out before the solder is melted, and it fills the intervening space between the pipe and fitting, thus tending to increase capillary action.

In the accompanying drawing, I have illustrated means for placing the solder insert in a fitting and also a completed joint.

Fig. 1 being a cross section through a fitting and one form of mandrel,

Fig. 2, a plan view of the mandrel of Fig. 1,

Fig. 3, a section through a modified form of fitting and mandrel, and

Fig. 4, a section through a completed joint.

Referring to the drawing, reference numeral 5 indicates a T-fitting comprising the three socket portions or sleeves 6, 7 and 8. Each of the sleeves is provided interiorly with an annular cavity or recess as at 9, 10 and 11, these recesses serving for the reception of rings of bonding material such as ordinary solder.

The mandrel shown at 12, Figs. 1 and 2, is in the form of a plug having a cylindrical portion 13 adapted to be received in closely fitting relation within the sleeve portions of the fitting. The projection of the mandrel within a fitting sleeve is limited by an annular abutment shoulder as at 14, Fig. 1, so that the mandrel is supported by the fitting in predetermined relation thereto.

The cylindrical portion of the mandrel is surmounted by an enlarged polygonal head 15 and extending longitudinally through head 15 and a portion of the body 13 are bores 16 and 17 which debouch through radial extensions 16' and 17' into the cavity 9 when the mandrel is placed in operative position, as in Fig. 1. Bore 16 serves as a sprue or loading duct and is rather larger than bore 17 which serves as a vent. A countersink or recess 18 is provided in the head at the mouth of bore 16 in order that the fused bonding material may be readily introduced into the sprue. Branch 16' of the sprue debouches substantially centrally into recess 9 and substantially diametrically opposite branch 17' of the vent which debouches into the recess 9 near its top.

With the parts disposed as shown in Fig. 1, melted solder is introduced through the sprue to fill recess 9, the trapped air being relieved through the vent. When the solder has hardened in the recess, the mandrel is removed and since its shape conforms closely to that of the recess margins, the exposed surface of the solder body or ring will form a substantially smooth continuation of the inner walls of the sleeve. Should the mandrel stick, a wrench may be applied to the head 15 to loosen it. It will be understood that recesses 10 and 11 will be filled in the same manner as above described in connection with recess 9.

The described operations may be carried out at the factory or at any time prior to the actual connection of the fitting into a line.

When a connection is to be made into the fitting, the pipe end 19, Fig. 4, is inserted in one of the sleeves, which may be assumed to be the sleeve 6, with a film of solder paste between the contiguous surfaces of the pipe end and sleeve. The solder paste may be applied to the pipe or to the sleeve or to both prior to their engagement, or it may be applied in any other suitable manner. With the parts engaged, heat is applied to the exterior of the coupling sleeve 6 so that the band of solder 20 is fused and flows in both directions from groove 9 filling the space between the pipe and the sleeve, a void being left in the groove as at 21. As soon as the solder appears at the end of the sleeve, the completion of the joint is indicated. It will be understood that for the sake of illustration, the thickness of the film of solder has been somewhat exaggerated in Fig. 4.

In Fig. 3, a T-fitting 22 having the three coupling sleeves 23, 24 and 25 is illustrated. Each of the sleeves is provided with an interior annular groove as at 26, 27 and 28, the latter groove being shown as filled with a band of solder 29. Each sleeve has a radial threaded bore as at 30, 31, and 32 in which are adapted to be received screw threaded closure plugs 33, 34, and 35. According to this embodiment of the invention, the bores 30, 31 and 32 are intended to serve as sprues and accordingly, a solid mandrel 36 may be used, this mandrel having a cylindrical portion 37 and a polygonal head 38 and being insertable in a coupling sleeve in the same manner as described in connection with the mandrel of Figs. 1 and 2.

According to this second embodiment of the invention, after the mandrel has been operatively positioned, the recess, for example recess 26, is filled through sprue 30, venting being secured around the mandrel body. Subsequent to the hardening of the solder in the recess, the mandrel is removed as before and plug 33 screwed into place to close the sprue. It will be understood that it is essential that means be provided for closing the sprue since otherwise, as when the fitting assumes a position with the sprue at the bottom, the solder could escape through the sprue upon the application of heat in forming the joint. On the other hand, since the fitting may be manipulated as desired when pouring the solder band, only a single sprue need be provided.

It will be understood that the above disclosure is merely illustrative of the invention and that I do not limit myself except as in the following claims.

I claim:

1. A mandrel for use in positioning a fusible body in a preformed recess about the wall of the bore of a pipe element, said mandrel having sprue and vent passages therein and extending from the portion of the mandrel exteriorly of the pipe element to the recess, said mandrel being of the same diameter as the bore of the pipe element to cause the inner surface of the fusible body to be flush with the wall of the bore of the pipe element.

2. A mandrel for use in positioning a fusible body in a preformed recess about the wall of the bore of a pipe element, said mandrel having vent and sprue passages therein and extending upwardly from the recess to the exterior of the mandrel, the vent opening extending from the upper portion of the recess, said mandrel being of the same diameter as the bore of the pipe element to cause the inner surface of the fusible body to be flush with the wall of the bore of the pipe element.

ROBERT H. MUELLER.